(12) United States Patent
Yamada et al.

(10) Patent No.: US 11,588,165 B2
(45) Date of Patent: Feb. 21, 2023

(54) FUEL CELL SYSTEM

(71) Applicant: TOYOTA JIDOSHA KABUSHIKI KAISHA, Toyota (JP)

(72) Inventors: Kazuyori Yamada, Okazaki (JP); Masaaki Matsusue, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 267 days.

(21) Appl. No.: 16/885,459

(22) Filed: May 28, 2020

(65) Prior Publication Data

US 2020/0395624 A1    Dec. 17, 2020

(30) Foreign Application Priority Data

Jun. 12, 2019  (JP) .............................. JP2019-109854

(51) Int. Cl.
*H01M 8/04858* (2016.01)
*H01M 8/04746* (2016.01)
*H01M 8/04537* (2016.01)

(52) U.S. Cl.
CPC ..... *H01M 8/0491* (2013.01); *H01M 8/04552* (2013.01); *H01M 8/04753* (2013.01)

(58) Field of Classification Search
None
See application file for complete search history.

(56) References Cited

U.S. PATENT DOCUMENTS

| 2010/0159340 A1* | 6/2010 | Oomori ............. H01M 8/04455 429/432 |
| 2019/0140294 A1 | 5/2019 | Namba et al. |

FOREIGN PATENT DOCUMENTS

| JP | 2011-249078 | 12/2011 |
| JP | 2012-009406 | 1/2012 |
| JP | 2015-201407 | 11/2015 |
| JP | 2019-087468 A | 6/2019 |
| WO | WO 2011/148262 | 12/2011 |
| WO | WO 2011/148265 | 12/2011 |

* cited by examiner

*Primary Examiner* — Brian R Ohara
*Assistant Examiner* — Patrick Marshall Greene
(74) *Attorney, Agent, or Firm* — Finnegan, Henderson, Farabow, Garrett & Dunner, LLP

(57) ABSTRACT

A fuel cell system includes a fuel cell stack in which a plurality of unit cells is stacked, a detection unit configured to detect a cell voltage of at least one of the unit cells, a converter configured to regulate an output current of the fuel cell stack, and a control device configured to control the converter. The control device executes current reduction processing for reducing the output current in a stepwise manner when the cell voltage detected by the detection unit is a negative voltage.

4 Claims, 11 Drawing Sheets

FUEL CELL SYSTEM

INCORPORATION BY REFERENCE

The disclosure of Japanese Patent Application No. 2019-109854 filed on Jun. 12, 2019 including the specification, drawings and abstract is incorporated herein by reference in its entirety.

BACKGROUND

1. Technical Field

The present disclosure relates to a fuel cell system.

2. Description of Related Art

In a case where a state in which fuel gas is not sufficiently supplied to some unit cells of a fuel cell stack is continued, a voltage of the unit cell may become a negative voltage and power generation performance may be degraded. For example, in Japanese Unexamined Patent Application Publication No. 2015-201407 (JP 2015-201407 A), a technique that eliminates a negative voltage by reducing an output current of a fuel cell stack is known (see JP 2015-201407 A).

SUMMARY

When the output current is reduced in order to eliminate the negative voltage, there is a possibility that a carbon carrier that carries a cathode catalyst of the unit cell having the negative voltage is oxidized and the cathode catalyst may be eluted to degrade power generation performance. In particular, in a case where the reduction of the output current is continuously performed, it is considered that such oxidation of the carbon carrier is promoted.

The disclosure provides a fuel cell system that eliminates a negative voltage while suppressing elution of a cathode catalyst of a fuel cell stack.

A first aspect of the disclosure relates to a fuel cell system. The fuel cell system includes a fuel cell stack, a detection unit, a converter, and a control device. In the fuel cell stack, a plurality of unit cells is stacked. The detection unit is configured to detect a cell voltage of at least one of the unit cells. The converter is configured to regulate an output current of the fuel cell stack. The control device is configured to control the converter. The control device executes current reduction processing for reducing the output current in a stepwise manner when the cell voltage detected by the detection unit is a negative voltage.

A second aspect of the disclosure relates to a fuel cell system. The fuel cell system includes a fuel cell stack, a detection unit, a converter, and a control device. In the fuel cell stack, a plurality of unit cells is stacked. The detection unit is configured to detect a cell voltage of at least one of the unit cells. The converter is configured to regulate an output current of the fuel cell stack. The control device is configured to control the converter. The control device executes current reduction processing for reducing the output current while increasing and decreasing when the cell voltage detected by the detection unit is a negative voltage.

A third aspect of the disclosure relates to a fuel cell system. The fuel cell system includes a fuel cell stack, a detection unit, a converter, a regulation device, and a control device. In the fuel cell stack, a plurality of unit cells is stacked. The detection unit is configured to detect a cell voltage of at least one of the unit cells. The converter is configured to regulate an output current of the fuel cell stack. The regulation device is configured to regulate a flow rate of cathode gas to be supplied to the fuel cell stack. The control device is configured to control the converter and the regulation device. The control device executes current reduction processing for restricting the flow rate of the cathode gas such that a cathode stoichiometric ratio becomes less than 1.0 and reducing the output current when the cell voltage detected by the detection unit is a negative voltage.

The fuel cell system may further include a regulation device configured to be controlled by the control device and regulate a flow rate of cathode gas to be supplied to the fuel cell stack. The control device may restrict the flow rate of the cathode gas such that a cathode stoichiometric ratio becomes less than 1.0 and may execute the current reduction processing when the cell voltage detected by the detection unit is a negative voltage.

The control device may continuously reduce the output current in the current reduction processing.

The control device may control the cathode stoichiometric ratio to be less than 1.0 by controlling the flow rate of the cathode gas to zero.

In the current reduction processing, the control device may set a period during which the output current is maintained at a given value to be longer than a period during which the output current is reduced.

The control device may reduce the output current to zero in the current reduction processing.

The fuel cell system may further include a regulation device configured to be controlled by the control device and regulate a flow rate of cathode gas to be supplied to the fuel cell stack. The control device may reduce the output current to zero in the current reduction processing, and after the current reduction processing is completed, may control the flow rate of the cathode gas to control an open-circuit voltage of the fuel cell stack within a target range while maintaining the output current at zero.

The control device may reduce the output current to zero in the current reduction processing, and after the current reduction processing is completed, may control the flow rate of the cathode gas to control an open-circuit voltage of the fuel cell stack within a target range while maintaining the output current at zero.

It is possible to provide a fuel cell system that eliminates a negative voltage while suppressing elution of a cathode catalyst of a fuel cell stack.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Configuration of Fuel Cell System

Figure 1:
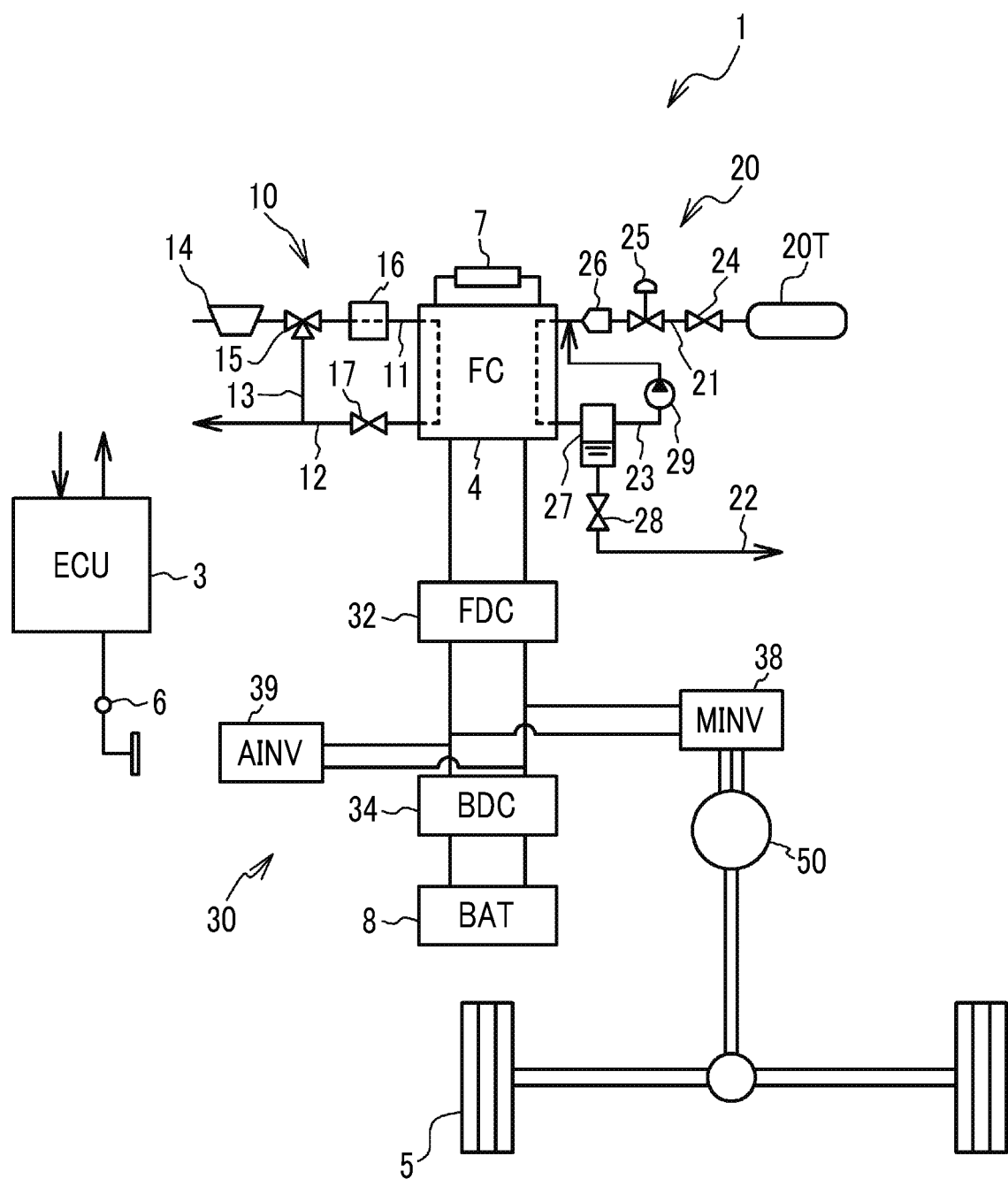
FIG. 1 is a configuration diagram of a fuel cell system mounted in a vehicle.

FIG. 1 is a configuration diagram of a fuel cell system 1 mounted in a vehicle. The fuel cell system 1 includes an electronic control unit (ECU) 3, a fuel cell (hereinafter, referred to as FC) 4, a cell monitor 7, a secondary battery (hereinafter, referred to as BAT) 8, a cathode gas supply system 10, an anode gas supply system 20, and a power control system 30. The fuel cell system 1 includes a cooling system (not shown) that circulates a coolant through the FC 4 to cool the FC 4. The vehicle includes a motor 50 for traveling, wheels 5, and an accelerator operation amount sensor 6. The FC 4 is a fuel cell that receives supply of cathode gas and anode gas, and generates power, and has a configuration in which a plurality of solid polymer electrolyte type unit cells is stacked.

The cathode gas supply system 10 supplies air including oxygen as the cathode gas to the FC 4, and includes a supply pipe 11, a discharge pipe 12, a bypass pipe 13, an air compressor 14, a bypass valve 15, an intercooler 16, and a back pressure valve 17. The supply pipe 11 is connected to a cathode inlet manifold of the FC 4. The discharge pipe 12 is connected to a cathode outlet manifold of the FC 4. The bypass pipe 13 communicates with the supply pipe 11 and the discharge pipe 12. The bypass valve 15 is provided in a connection portion of the supply pipe 11 and the bypass pipe 13. The bypass valve 15 switches a communication state of the supply pipe 11 and the bypass pipe 13. The air compressor 14, the bypass valve 15, and the intercooler 16 are disposed on the supply pipe 11 in order from an upstream side. The back pressure valve 17 is disposed on the discharge pipe 12 upstream of a connection portion of the discharge pipe 12 and the bypass pipe 13. The air compressor 14 supplies air including oxygen as the cathode gas to the FC 4 through the supply pipe 11. The cathode gas supplied to the FC 4 is discharged through the discharge pipe 12. The intercooler 16 cools the cathode gas supplied to the FC 4. The back pressure valve 17 regulates back pressure on the cathode side of the FC 4. The drive of the air compressor 14, the bypass valve 15, and the back pressure valve 17 is controlled by the ECU 3. The ECU 3 can regulate a flow rate of the cathode gas supplied to the FC 4 by controlling a rotation speed of the air compressor 14. In addition, the ECU 3 can regulate the flow rate of the cathode gas supplied to the FC 4 and the flow rate of the cathode gas bypassed the FC 4 by controlling opening degrees of the bypass valve 15 and the back pressure valve 17. The cathode gas supply system 10 is an example of a regulation device that regulates the flow rate of the cathode gas supplied to the FC 4.

The anode gas supply system 20 supplies hydrogen gas as the anode gas to the FC 4, and includes a tank 20T, a supply pipe 21, a discharge pipe 22, a circulation pipe 23, a tank valve 24, a pressure regulation valve 25, an injector (hereinafter, referred to as INJ) 26, a gas-liquid separator 27, a drain valve 28, and a hydrogen circulation pump (hereinafter, referred to as HP) 29. The tank 20T and the anode inlet manifold of the FC 4 are connected by the supply pipe 21. In the tank 20T, the hydrogen gas that is the anode gas is stored. The discharge pipe 22 is connected to the anode outlet manifold of the FC 4. The circulation pipe 23 communicates with the gas-liquid separator 27 and the supply pipe 21. The tank valve 24, the pressure regulation valve 25, and the INJ 26 are disposed in order from an upstream side of the supply pipe 21. In a state in which the tank valve 24 is opened, an opening degree of the pressure regulation valve 25 is regulated, and the INJ 26 injects the anode gas. With this, the anode gas is supplied to the FC 4. In the discharge pipe 22, the gas-liquid separator 27 and the drain valve 28 are disposed in order from an upstream side. The gas-liquid separator 27 separates and stores moisture from the anode gas discharged from the FC 4. Water stored in the gas-liquid separator 27 is discharged outside the fuel cell system 1 through the discharge pipe 22 when the drain valve 28 is opened. The circulation pipe 23 is a pipe that recirculates the anode gas to the FC 4 and has an upstream end portion connected to the gas-liquid separator 27. The HP 29 is disposed in the circulation pipe 23. The anode gas discharged from the FC 4 is moderately pressurized by the HP 29 and is guided to the supply pipe 21. The drive of the tank valve 24, the pressure regulation valve 25, the INJ 26, the drain valve 28, and the HP 29 is controlled by the ECU 3.

The power control system 30 controls discharging of the FC 4 and charging and discharging of the BAT 8. The power control system 30 includes a fuel cell DC/DC converter (hereinafter, referred to as FDC) 32, a battery DC/DC converter (hereinafter, referred to as BDC) 34, a motor inverter (hereinafter, referred to as MINV) 38, and an accessory inverter (hereinafter, referred to as AINV) 39. The FDC 32 controls the output current of the FC 4 based on a requested current value transmitted from the ECU 3. The FDC 32 regulates direct-current power from the FC 4 and outputs the regulated direct-current power to the MINV 38 or the AINV 39. The BDC 34 regulates direct-current power from the BAT 8 and outputs the regulated direct-current power to the MINV 38 or the AINV 39. The BAT 8 can be charged with generated power of the FC 4. The MINV 38 converts the input direct-current power to three-phase alternating-current power and supplies the three-phase alternating-current power to the motor 50. The motor 50 drives the wheels 5 to make the vehicle travel. The motor 50 functions as a power generator that generates power based on kinetic energy input from the wheels 5 when the vehicle decelerates or travels downhill Power of the FC 4 and the BAT 8 can be supplied to load devices other than the motor 50 through the AINV 39. Here, the load devices include accessories for the FC 4 and accessories for the vehicle. The accessories for the FC 4 include the air compressor 14, the bypass valve 15, the back pressure valve 17, the tank valve 24, the pressure regulation valve 25, the INJ 26, the drain valve 28, and the HP 29 described above. The accessories for the vehicle include, for example, air conditioning equipment, lighting devices, hazard flashers, and the like.

The ECU 3 includes a central processing unit (CPU), a read only memory (ROM), and a random access memory (RAM). The accelerator operation amount sensor 6, the air compressor 14, the bypass valve 15, the back pressure valve 17, the tank valve 24, the pressure regulation valve 25, the INJ 26, the drain valve 28, the HP 29, the FDC 32, and the BDC 34 are electrically connected to the ECU 3. The ECU 3 calculates a requested output to the FC 4 based on a detection value of the accelerator operation amount sensor 6, drive states of the accessories for the vehicle and the accessories for the FC 4 described above, stored power of the BAT 8, and the like, and calculates the requested current value to the FC 4 based on the requested output. The ECU 3 controls the air compressor 14 or the INJ 26 according to the requested output to the FC 4 to control the flow rates of the cathode gas and the anode gas supplied to the FC 4, and controls the output current of the FC 4 by controlling the FDC 32 based on the requested current value of the FC 4. The ECU 3 is an example of a control device that executes negative voltage elimination control described below. The cell monitor 7 detects a voltage of each unit cell of the FC 4, and the ECU 3 determines whether or not any of the cell voltages of the respective unit cells is a negative voltage.

Negative Voltage

Figure 2:
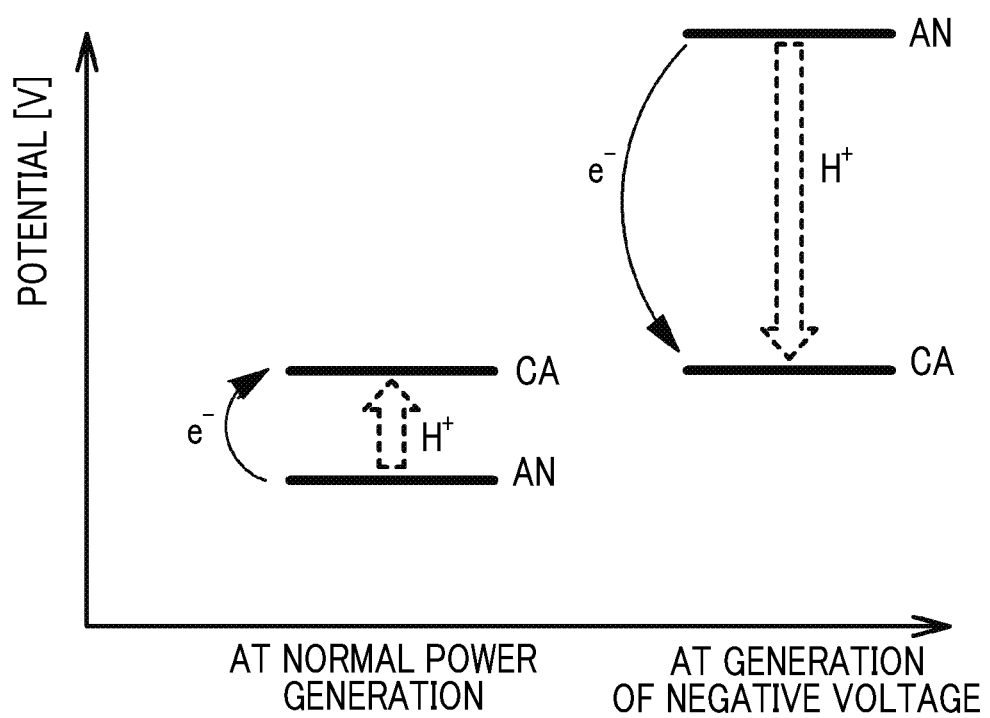
FIG. 2 is a diagram showing anode potential and a cathode potential of a unit cell in a normal power generation state, and an anode potential and a cathode potential of a unit cell in which a cell voltage is a negative voltage.

FIG. 2 is a diagram showing an anode potential and a cathode potential of the unit cell in a normal power generation state, and an anode potential and a cathode potential of the unit cell in which the cell voltage is a negative voltage. In the unit cell in the normal power generation state, a reaction of Expression (1) described below occurs on an anode side, a reaction of Expression (2) described below occurs on a cathode side, and the cathode potential is higher than the anode potential.

$$H_2 \rightarrow 2H^+ + 2e^- \quad (1)$$

$$4H^+ + O_2 + 4e^- \rightarrow 2H_2O \quad (2)$$

Here, while the FC 4 is stopped in an environment below a freezing point, an anode flow passage in the FC 4 may be blocked due to freezing of residual water. In a case where the FC 4 is started in such a state, the anode gas may not be sufficiently supplied to some unit cells, the anode gas may be deficient, the anode potential of each of some unit cells may increase, and the cell voltage of each of some unit cells may become a negative voltage. In a case where the cell voltage of the unit cell is a negative voltage, it is considered that the following problem occurs.

As shown in FIG. 2, in a unit cell having a negative voltage, the amount of protons obtained by the reaction of Expression (1) decreases due to a hydrogen shortage. For this reason, as shown in Expression (3) described below, a carbon carrier carrying an anode catalyst reacts with water and is oxidized to generate protons so as to compensate for the decrease in the amount of protons.

$$C + 2H_2O \rightarrow CO_2 + 4H^+ + 4e^- \quad (3)$$

In a case where the carbon carrier is oxidized, there is a concern that the anode catalyst is eluted or a particle size increases, and the power generation performance of the unit cell having the negative voltage is degraded. In this way, in a case where the cell voltage is left at the negative voltage, the power generation performance of the unit cell is degraded.

Here, in addition to a platinum catalyst, a catalyst that promotes a decomposition reaction of water is added to an anode catalyst layer of each unit cell of the FC 4. The catalyst is, for example, iridium oxide or ruthenium oxide. For this reason, as shown in Expression (4) described below, the decomposition reaction of water is promoted to generate protons, and the oxidation of the carbon carrier shown in Expression (3) is suppressed.

$$2H_2O \rightarrow O_2 + 4H^+ + 4e^- \quad (4)$$

A reaction shown in Expression (5) described below occurs on the cathode side of the unit cell in which the cell voltage is a negative voltage.

$$4H^+ + O_2 + 4e^- \rightarrow 2H_2O \quad (5)$$

As described above, elution or the like of the anode catalyst due to the negative voltage can be suppressed by the water decomposition promotion catalyst added to the anode catalyst layer; however, there is a need to eliminate the negative voltage itself. The elimination of the negative voltage can be implemented by gradually reducing the output current of the FC 4. In a process in which the output current of the FC 4 is reduced in order to eliminate the negative voltage, the cathode potential of the unit cell having the negative voltage increases. In the process, as in Expressions (6) and (7) described below, the carbon carrier carrying the cathode catalyst of the unit cell having the negative voltage is oxidized. With this, there is a possibility that the cathode catalyst is eluted and the power generation performance is degraded.

$$Pt + H_2O \rightarrow PtO + 2H^+ + 2e^- \quad (6)$$

$$2PtO + C/Pt \rightarrow 3Pt + CO_2 \quad (7)$$

In particular, when the output current of the FC 4 is reduced to zero in order to eliminate the negative voltage, the cathode potential of the unit cell having the negative voltage increases from a state around or lower than 0 V to an open-circuit voltage, for example, near 1.0 V. In a case where the increase in the cathode potential of the unit cell having the negative voltage is continued in this way, there is a possibility that the reactions of Expressions (6) and (7) are continued in an activated state, the amount of oxygen of the carbon carrier of the cathode catalyst increases, and the cathode catalyst is eluted. It is considered that the faster an increase rate of the cathode potential is, the more the reactions of Expressions (6) and (7) are promoted. That is, it is considered that such reactions are promoted as the reduction of the output current is continuously performed and a reduction rate of the output current is faster.

In a first example, when the voltage of any unit cell is a negative voltage, the output current of the FC 4 is reduced in a stepwise manner, thereby eliminating the negative voltage. As the output current is reduced in a stepwise manner, it is possible to suppress an increase in the amount of oxygen of the carbon carrier of the cathode catalyst of the unit cell having the negative voltage to suppress elution of the cathode catalyst. In the following description, a unit cell in which the cell voltage is a negative voltage is referred to as a "negative voltage cell". For convenience of description, although a unit cell in which the cell voltage is a negative voltage, the negative voltage has been eliminated through negative voltage elimination control described below is also referred to as a "negative voltage cell".

NEGATIVE VOLTAGE ELIMINATION CONTROL OF FIRST EXAMPLE

Figure 3:
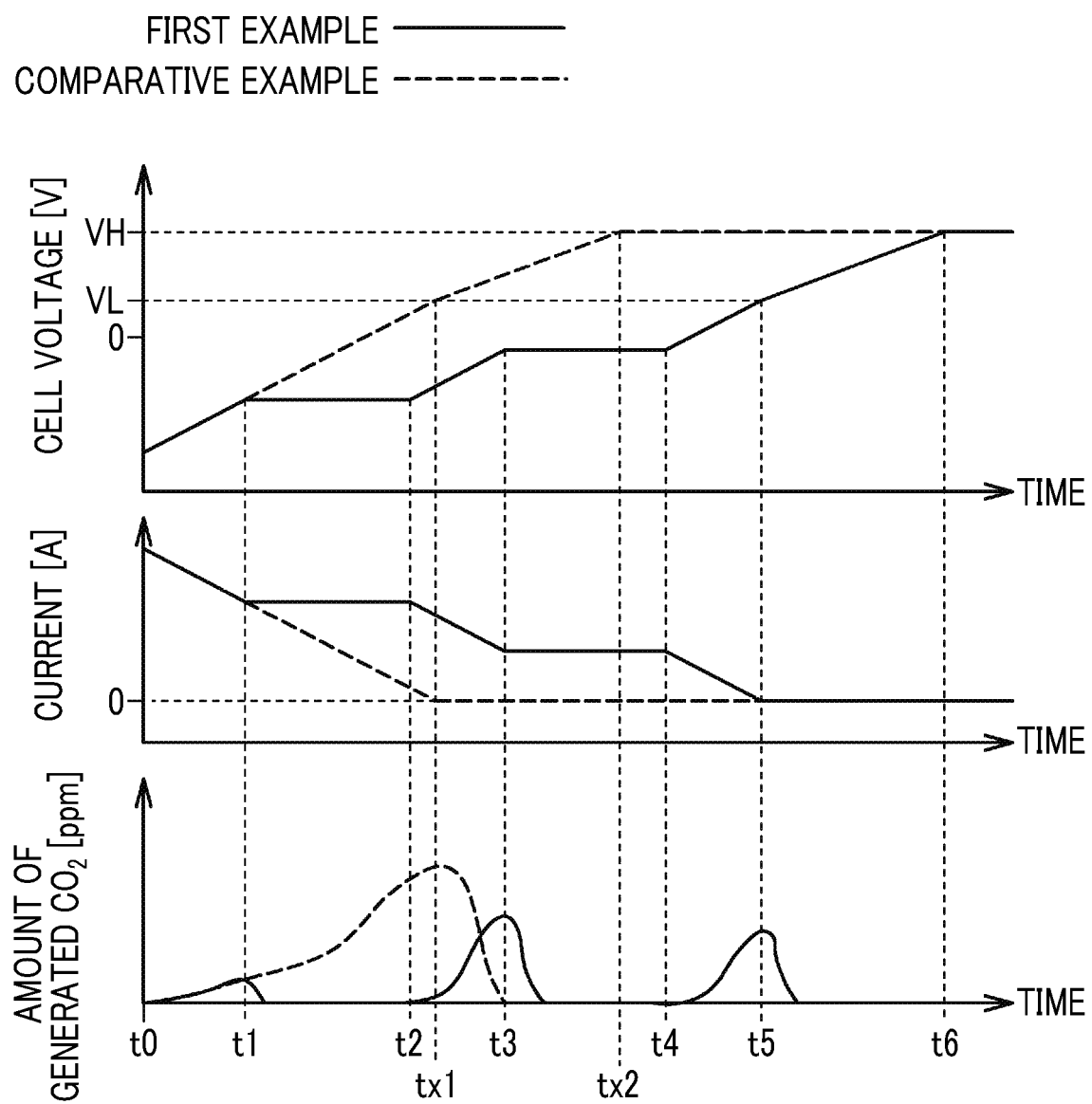
FIG. 3 is a timing chart showing an example of negative voltage elimination control of a first example.

FIG. 3 is a timing chart showing an example of negative voltage elimination control of the first example. As described above, in the negative voltage elimination control of the first example, current reduction processing for reducing the output current of the FC 4 in a stepwise manner is executed. FIG. 3 shows changes in the cell voltage of the negative voltage cell, the output current of the FC 4, and a generation amount (ppm) of $CO_2$ generated in the cathode flow passage of the FC 4. FIG. 3 also shows a comparative example where an output current is reduced continuously is also described. In FIG. 3, values relating to the first example are indicated by solid lines, and values relating to the comparative example are indicated by dotted lines.

In the comparative example, the output current is continuously reduced to zero at a given rate from time t0 to time tx1. In the comparative example, the generation amount of $CO_2$ constantly increases with time in a period during which the output current is reduced. In this way, the generation amount of $CO_2$ constantly continues to increase until the output current becomes zero, and there is a possibility that a total generation amount of $CO_2$ increases to increase the amount of elution of the cathode catalyst. In the comparative example, as will be described below in detail, after the output current is controlled to zero as in the first example, when the cell voltage of the negative voltage cell becomes a threshold value VH at time tx2, the power generation restart standby processing is executed.

In the first example, the output current is reduced from time t0 to time t1, and the output current is maintained at a given value from time t1 to time t2. Thereafter, the output current is reduced again from time t2 to time t3, and the output current is maintained at a given value from time t3 to time t4. The output current is reduced again from time t4, and in a case where the cell voltage of the negative voltage cell at time t5 becomes a threshold value VL described below, the output current is controlled to zero. In a period during which the output current is reduced, the generation amount of $CO_2$ increases with time as in the comparative example; however, the output current is maintained at a given value before the generation amount of $CO_2$ becomes excessive. In a case where the output current is maintained at a given value, since a potential on the cathode side is not changed, the reactions of Expressions (6) and (7) described above are suppressed, and the generation amount of $CO_2$ is reduced to substantially zero.

In this way, as the output current is reduced in a stepwise manner, it is possible to eliminate the negative voltage while suppressing the total generation amount of $CO_2$ compared to the comparative example, and to suppress elution of the cathode catalyst. Since the output current is reduced to zero, the reaction of Expression (3) described above on the anode side is further suppressed, and an increase in the cell voltage of the negative voltage cell can be promoted.

As shown in FIG. 3, it is preferable that each of the period of time t1 to time t2 and the period of time t3 to time t4, during which the output current is maintained at a given value is longer than each of the period of time t0 to time t1, the period of the time t2 to time t3, and the period of time t4 to time t5, during which the output current is reduced. This is because, as the period during which the output current is maintained at a given value is secured to be long, the period during which the cell voltage is maintained at a given value is also secured to be long, and it is possible to suppress the reactions of Expressions (6) and (7) described above when the output current is reduced subsequently, and to suppress the generation amount of $CO_2$.

In the first example, in a case where the output current is controlled to zero at time t5, the open-circuit voltage of the negative voltage cell increases due to the cathode gas and the anode gas continuously supplied to the FC 4. In a case where the cell voltage of the negative voltage cell becomes the threshold value VH at time t6, the power generation restart standby processing described below in detail is executed, and the flow rates of the cathode gas and the anode gas supplied to the FC 4 are regulated such that the cell voltage of the negative voltage cell is maintained within a predetermined target range. The power generation restart standby processing will be described below in detail. In FIG. 3, the threshold value VL is shown as, but not limited to, a value greater than zero. The threshold value VL will be described below in detail.

Figure 4:
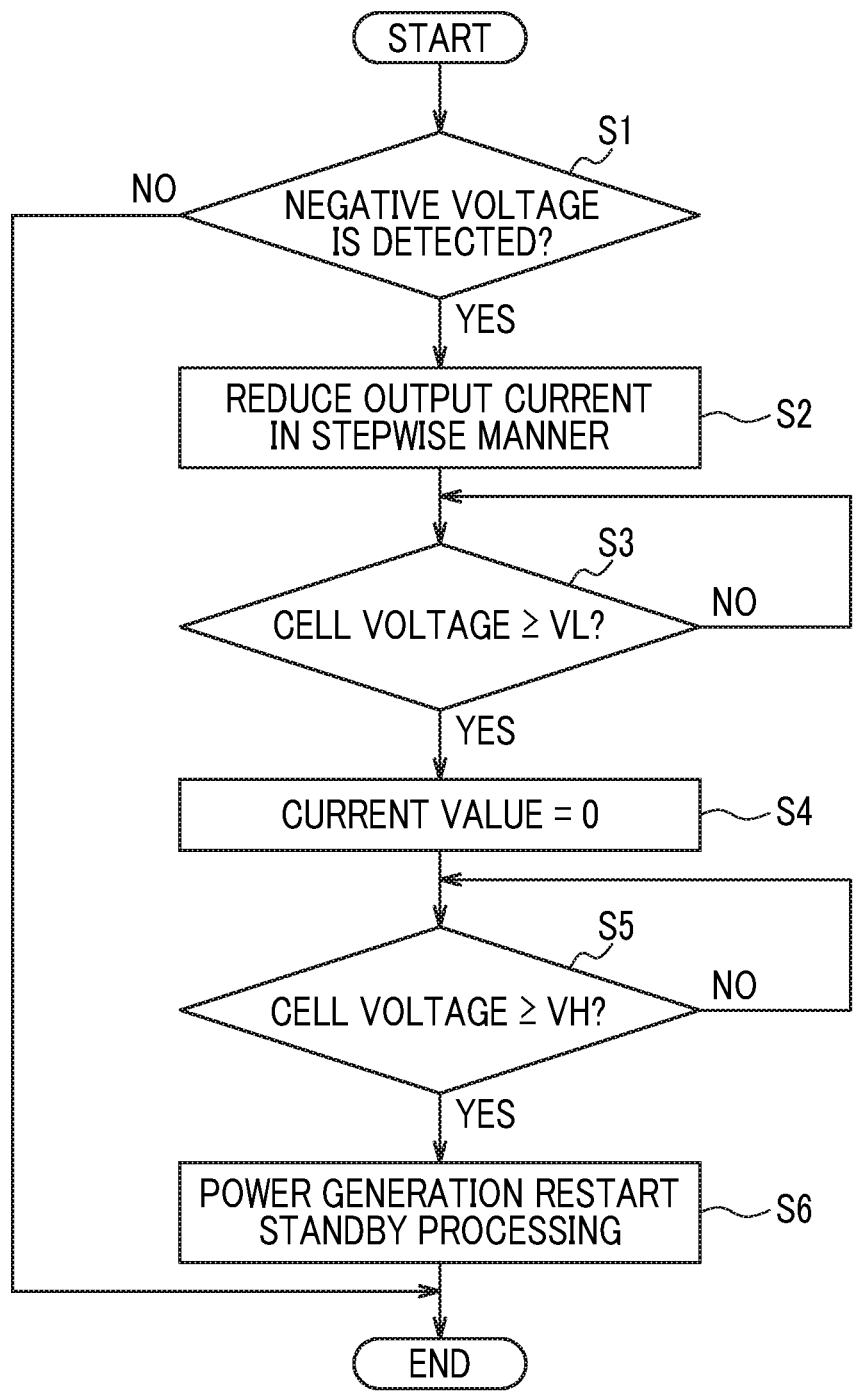
FIG. 4 is a flowchart showing an example of the negative voltage elimination control of the first example.

FIG. 4 is a flowchart showing an example of the negative voltage elimination control of the first example. The ECU 3 determines whether or not detection is made that the voltage of any unit cell is a negative voltage based on a detection result of the cell monitor 7 (Step S1). For example, when the voltage of any unit cell is equal to or less than −0.1 V, determination is made that the cell voltage of the unit cell is a negative voltage. When determination is made to be No in Step S1, the control ends.

When the voltage of any unit cell is a negative voltage (in Step S1, Yes), the ECU 3 executes the current reduction processing for reducing the output current of the FC 4 in a stepwise manner as described above (Step S2). Specifically, the ECU 3 controls the FDC 32 to reduce the output current of the FC 4 in a stepwise manner. Here, the current reduction processing is executed without depending on an accelerator operation amount and the like operated by a driver. This is to eliminate the negative voltage early. The flow rates of the cathode gas and the anode gas supplied to the FC 4 during the execution of the current reduction processing in the first example are controlled so as to correspond to the output of the FC 4 as in a normal operation state.

Next, the ECU 3 determines whether or not the cell voltage of the negative voltage cell becomes equal to or greater than the threshold value VL (Step S3). The threshold value VL is a value at which the cell voltage of the negative voltage cell can be considered to be no longer a voltage causing a problem as the output current is reduced. The threshold value VL is, for example, any value greater than −0.1 V and less than 0.1 V.

The ECU 3 is on standby until the cell voltage of the negative voltage cell becomes equal to or greater than the threshold value VL, in a case where the cell voltage of the negative voltage cell becomes equal to or greater than the threshold value VL (in Step S3, Yes), determines that the negative voltage is eliminated, and controls the output current of the FC 4 to zero (Step S4). That is, the power generation of the FC 4 is paused. A method of controlling the output current to zero may be implemented by controlling the FDC 32 such that a current value swept from the FC 4 becomes zero or may be implemented by controlling a switch provided in the FDC 32 and configured to switch a connection state of the FC 4 and an accessory to cut off the FC 4 and the accessory. The ECU 3 continuously supplies the cathode gas and the anode gas to the FC 4 based on an output of the BAT 8 even after the power generation of the FC 4 is paused or supplies the cathode gas and the anode gas to the FC 4 intermittently at a given time interval.

Next, determination is made whether or not the cell voltage of the negative voltage cell becomes equal to or greater than the threshold value VH (Step S5). The threshold value VH is a value at which the cell voltage of the negative voltage cell can be considered to be sufficiently recovered to the same level as other normal unit cells. The threshold value VH is a value equal to or less than 1.0 V, and is, but not limited to, for example, any value between 0.4 V to 0.7 V.

The ECU 3 is on standby until the cell voltage of the negative voltage cell becomes equal to or greater than the threshold value VH, and in a case where the cell voltage of the negative voltage cell becomes equal to or greater than the threshold value VH (in Step S5, Yes), the ECU 3 executes the power generation restart standby processing (Step S6).

Specifically, the processing is to maintain the open-circuit voltage of the FC 4 in a power generation pause state within a predetermined target range by performing control for primarily increasing or decreasing the flow rate of the cathode gas supplied to the FC 4. The processing is also referred to as an intermittent operation. In a case where the power generation restart standby processing is executed, the flow rate of the cathode gas supplied to the FC 4 is controlled to such an extent that the open-circuit voltage is reduced, and in a case where the open-circuit voltage falls below a lower limit value of the target range, the flow rate of the cathode gas temporarily increase to such an extent that the open-circuit voltage increases. In a case where the open-circuit voltage exceeds an upper limit value of the target range, the flow rate of the cathode gas is controlled again to such an extent that the open-circuit voltage is reduced. During the execution of the power generation restart standby processing, in a case where the requested output to the FC 4 becomes equal to or greater than a predetermined value, the ECU 3 restarts the power generation of the FC 4.

In this way, the open-circuit voltage of the FC 4 in the power generation pause state is maintained within the target range, whereby an oxygen concentration on the cathode side of the FC 4 can be maintained at a concentration suitable for restarting the power generation, and degradation in responsiveness of the output of the FC 4 at the time of restarting the power generation is suppressed. The target range of the open-circuit voltage described above is, but not limited to, for example, 0.6 V to 0.8 V. The supply of the anode gas is performed intermittently at a predetermined time interval regardless of the open-circuit voltage of the FC 4 such that a hydrogen deficiency state is not brought at the time of restarting the power generation. In a case where the above-described negative voltage elimination control is executed, the power generation of the FC 4 is temporarily paused; however, a shortage of output power is compensated by the output of the BAT 8.

The phrase "reducing the output current in a stepwise manner" in the first example means that, after the output current is reduced, the output current is maintained at a given value for a predetermined period, and thereafter, the output current is reduced again. In this way, the output current is reduced while interposing at least once a period during which the output current is maintained at a given value. The output current may be reduced at a given rate or may be reduced while changing a rate. Alternatively, the output current may be maintained at a given value for a predetermined period by gradually decreasing the reduction rate of the output current, and thereafter, the output current may be reduced in a stepwise manner by gradually increasing the reduction rate of the output current. The period during which the output current is reduced is not always limited to the same period. Similarly, the period during which the output current is maintained at a given value is not always limited to the same period. As the output current is closer to zero, the amount of reduction of the output current in one period during which the output current is reduced may be set to gradually decrease. The period during which the output current is reduced, the period during which the output current is maintained at a given value, and the like may be controlled taking into consideration a shortage of the actual output with respect to the requested output to the FC 4.

SECOND EXAMPLE

In negative voltage elimination control of a second example, the output current is reduced at a given rate as in the above-described comparative example; however, before the start of the current reduction processing, the flow rate of the cathode gas is restricted such that a cathode stoichiometric ratio becomes less than 1.0. The term "stoichiometric ratio" indicates a ratio of an amount of actually supplied reactant gas to a theoretical amount of reactant gas based on a requested amount of power generation. For example, in a normal operation state excluding a low-efficiency operation state, such as warm-up operation, the flow rates of the cathode gas and the anode gas are controlled such that the cathode stoichiometric ratio and an anode stoichiometric ratio are maintained at 1.5, respectively, and the power generation is performed at high efficiency.

The cathode stoichiometric ratio is controlled to be less than 1.0 before the start of the current reduction processing in this way, whereby an oxygen concentration on the cathode side of a plurality of unit cells including a negative voltage cell decreases, the reaction of Expression (5) described above is suppressed, and hydrogen pumping shown in Expression (8) described below occurs.

$$2H^+ + 2e^- \rightarrow H_2 \quad (8)$$

Figure 5:
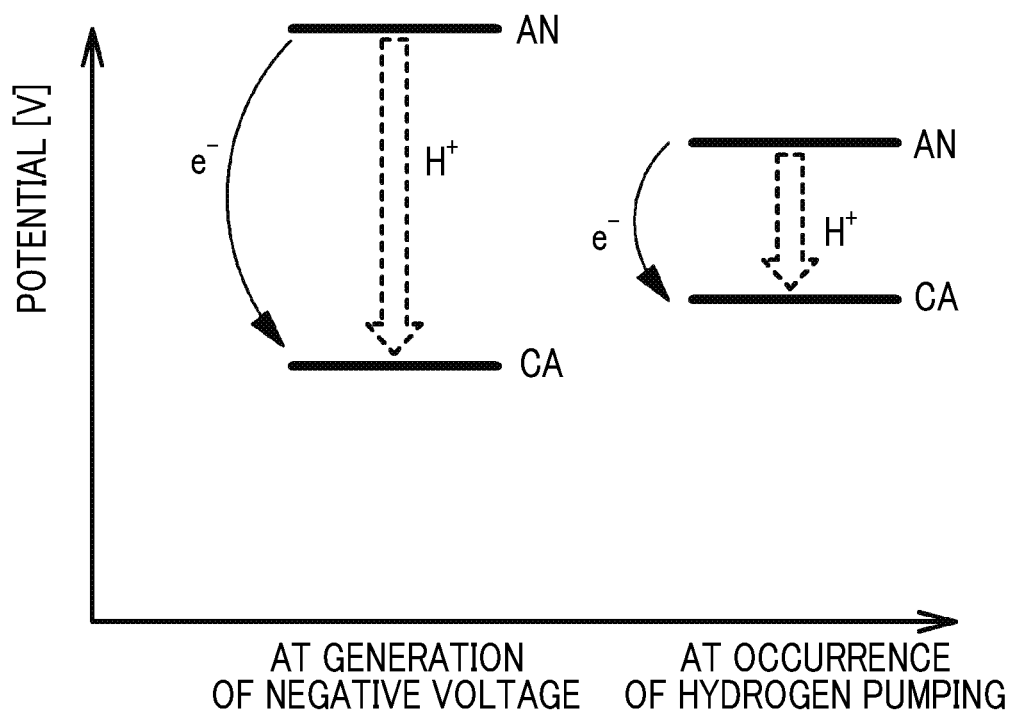
FIG. 5 shows an anode potential and a cathode potential of a negative voltage cell, and an anode potential and a cathode potential in a state in which hydrogen pumping occurs in the negative voltage cell.

Hydrogen pumping is a reaction in which protons generated on the anode side pass through an electrolyte membrane to generate hydrogen on the cathode side. Two-electron reduction of the protons causes a hydrogen generation reaction on the cathode side in this way, whereby the anode potential decreases, the cathode potential increases, and a potential difference becomes small. FIG. 5 shows an anode potential and a cathode potential of a negative voltage cell, and an anode potential and a cathode potential in a state in which hydrogen pumping occurs in the negative voltage cell. The reaction of Expression (8) on the cathode side is promoted, whereby the reaction of Expression (6) described above is suppressed, and thus, the reaction of Expression (7) is also suppressed. For this reason, even though the cell voltage increases due to hydrogen pumping, the generation amount of $CO_2$ from the cathode side is suppressed.

Figure 6:
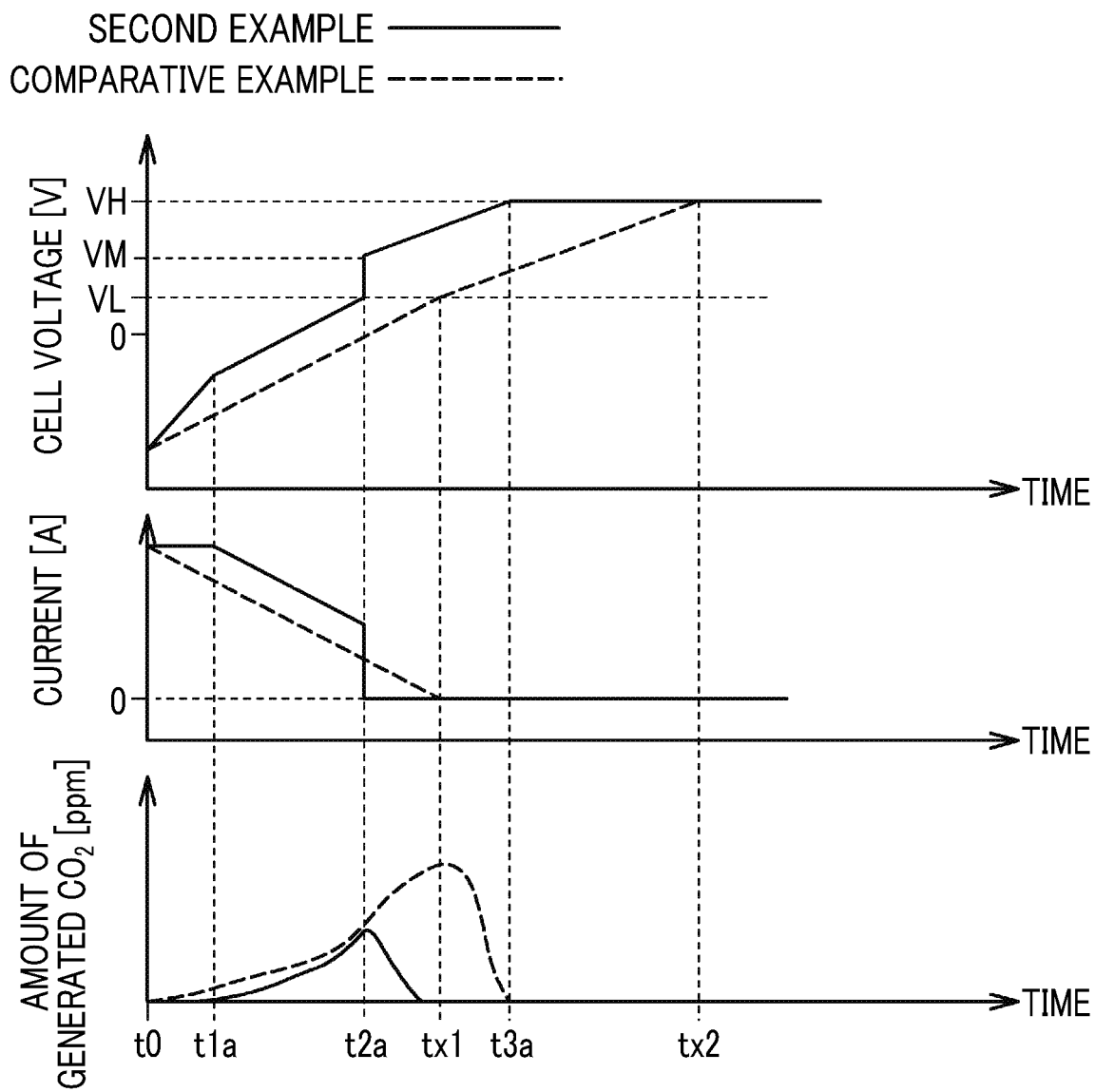
FIG. 6 is a timing chart showing an example of negative voltage elimination control of a second example.

FIG. 6 is a timing chart showing an example of the negative voltage elimination control of the second example. In FIG. 6, as in FIG. 3, values relating to a comparative example are indicated by dotted lines, and values relating to the second example are indicated by solid lines. In the second example, the flow rate of the cathode gas supplied to the FC 4 is controlled to zero, whereby the cathode stoichiometric ratio is controlled to be less than 1.0. Specifically, the flow rate of the cathode gas supplied to the FC 4 is controlled to zero at time t0. With this, hydrogen pumping occurs and the cell voltage of the negative voltage cell starts to increase. In a period during which the cell voltage increases, the generation of $CO_2$ is suppressed as described above. Next, at time t1a, the output current is continuously reduced at a given rate while maintaining the flow rate of the cathode gas at zero. In a case where the cell voltage of the negative voltage cell becomes equal to or greater than the threshold value VL at time t2a, determination is made that the negative voltage is eliminated, and the output current is controlled to zero.

In a case where the output current is controlled to zero at time t2a, the open-circuit voltage of the FC 4 increases, and the cell voltage of the negative voltage cell also increases. The supply of the cathode gas is restarted at time t2a, the open-circuit voltage of the FC 4 further increases, and the cell voltage of the negative voltage cell also further increases. In a case where the cell voltage becomes equal to or greater than the threshold value VH at time t3a, the power generation restart standby processing is executed.

In the second example, the output current is maintained at a given value from time t0 to time t1a; however, the cell voltage of the negative voltage cell increases due to hydrogen pumping in the period, and thereafter, the output current is continuously reduced to zero. For this reason, it is possible to increase the cell voltage of the negative voltage cell to the threshold value VL earlier than in the first example, and to eliminate the negative voltage early. The negative voltage is eliminated using hydrogen pumping, whereby it is possible to suppress the total generation amount of $CO_2$ compared to the comparative example.

Here, as shown in FIG. 6, an increase rate of the cell voltage due to hydrogen pumping is faster than an increase rate of the cell voltage due to the reduction of the output current. In other words, it is preferable to restrict the flow rate of the cathode gas and to control a reduction rate of the output current such that such a relationship is established. Since the reactions of Expressions (6) and (7) are suppressed and the reaction of Expression (8) is promoted as described above, even though the increase rate of the cell voltage due to hydrogen pumping is fast, it is possible to comparatively suppress the generation amount of $CO_2$. In contrast, it is considered that the generation amount of $CO_2$ with an increase in cell voltage due to the reduction of the output current can be more suppressed as the reduction rate of the output current is slower. This is because it is preferable that the increase rate of the cell voltage due to hydrogen pumping is fast from a viewpoint of eliminating the negative voltage early, and it is preferable that the reduction rate of the output current is slower from a viewpoint of suppressing the generation amount of $CO_2$.

Figure 7:
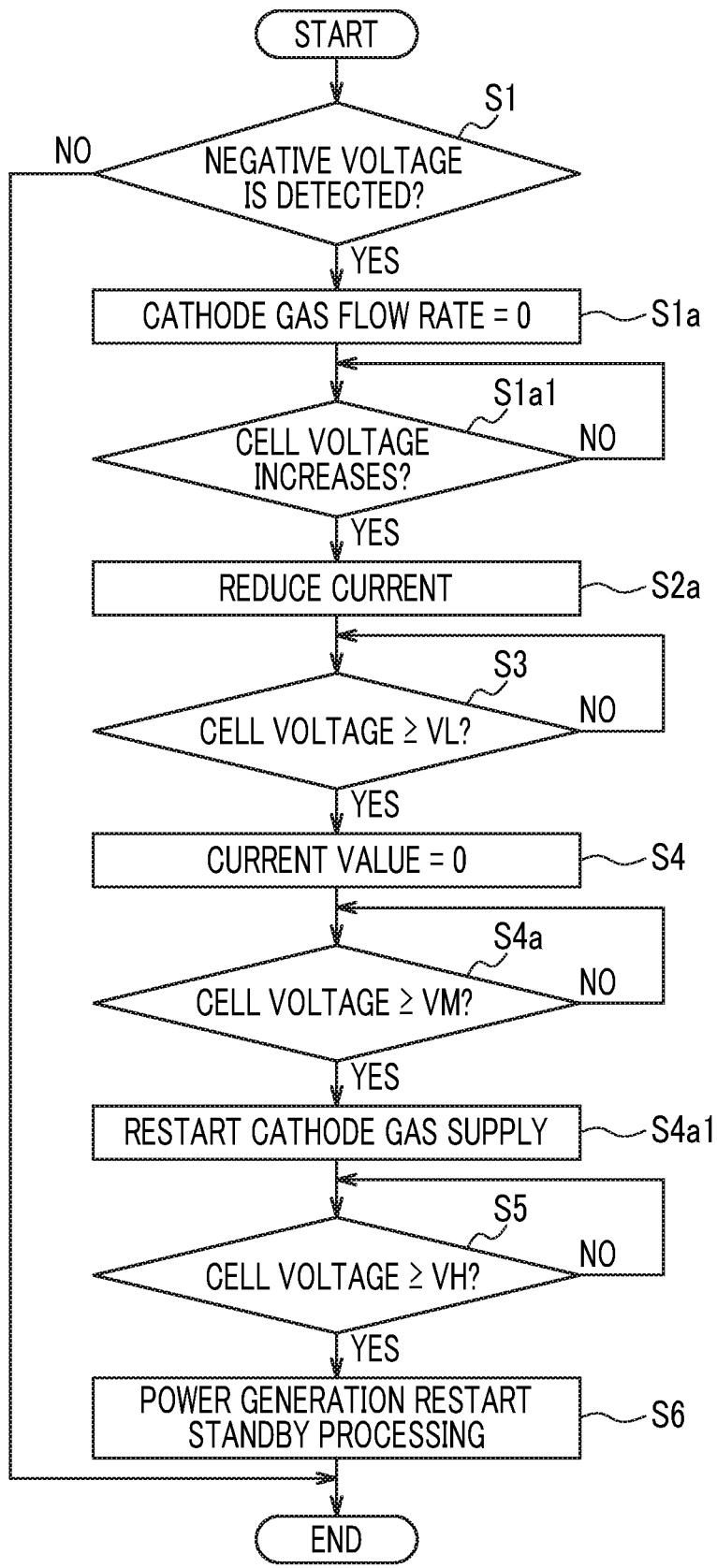
FIG. 7 is a flowchart showing an example of the negative voltage elimination control of the second example.

FIG. 7 is a flowchart showing an example of the negative voltage elimination control of the second example. In the negative voltage elimination control of the second example, description of the same processing as in the first example will not be repeated. When determination is made to be Yes in Step S1, the ECU 3 controls the flow rate of the cathode gas to the FC 4 to zero (Step S1a). Specifically, the ECU 3 stops the drive of the air compressor 14. Even after the flow rate of the cathode gas is controlled to zero in Step S1a, the flow rate of the anode gas is controlled such that the stoichiometric ratio of the anode gas is sufficiently high so as to restrain so-called hydrogen deficiency.

Next, the ECU 3 determines whether or not the cell voltage of the negative voltage cell increases by a predetermined value or more (Step S1a1). That is, determination is made whether or not the cell voltage of the negative voltage cell increases by the predetermined value or more due to hydrogen pumping. The predetermined value is a value determined based on the amount of increase of the cell voltage assumed when hydrogen pumping occurs, and is acquired by an experiment in advance.

The ECU 3 is on standby until the cell voltage of the negative voltage cell increases by the predetermined value or more in a state in which the flow rate of the cathode gas supplied to the FC 4 is controlled to zero, and in a case where the cell voltage of the negative voltage cell increases by the predetermined value or more (in Step S1a1, Yes), the ECU 3 reduces the output current of the FC 4 (Step S2a).

Next, in a case where the cell voltage of the negative voltage cell becomes equal to or greater than the threshold value VL (in Step S3, Yes), and the output current is controlled to zero (Step S4), the ECU 3 determines whether or not the cell voltage of the negative voltage cell is equal to or greater than a threshold value VM (Step S4a). The threshold value VM is a value greater than the above-described threshold value VL and smaller than the threshold value VH, and is a value at which the negative voltage can be considered to be eliminated by the effects of both of hydrogen pumping and the reduction of the output current in a state where the flow rate of the cathode gas is controlled to zero and the output current is also controlled to zero.

The ECU 3 is on standby until the cell voltage of the negative voltage cell becomes equal to or greater than the threshold value VM, and in a case where the cell voltage of the negative voltage cell becomes equal to or greater than the threshold value VM (in Step S4a, Yes), restarts the supply of the cathode gas to the FC 4 (Step S4a1). Specifically, the ECU 3 restarts the air compressor 14 based on the output of the BAT 8. It is preferable that the rotation speed of the air compressor 14 after the restart is set to such an extent that the open-circuit voltage of the FC 4 increases. Thereafter, in a case where the cell voltage of the negative voltage cell becomes equal to or greater than the threshold value VH (in Step S5, Yes), the power generation restart standby processing is executed (Step S6).

In the second example, although the flow rate of the cathode gas is controlled to zero in Step S1a, the disclosure is not limited thereto, and the rotation speed of the air compressor 14 may be regulated such that the cathode stoichiometric ratio is maintained to be less than 1.0, whereby the cathode gas may be continuously supplied to the FC 4 such that the cathode stoichiometric ratio is maintained to be less than 1.0. With this, the oxygen concentration on the cathode side is reduced, and the cell voltage of the negative voltage cell can be increased by hydrogen pumping.

In a case where the reduction of the output current is performed over a long period in a state in which the flow rate of the cathode gas is controlled to zero, a large amount of hydrogen is generated on the cathode side by hydrogen pumping, and a hydrogen concentration in the cathode flow passage of the FC 4 increases. For this reason, when the supply of the cathode gas is restarted, gas having a high hydrogen concentration is discharged to the outside. On the other hand, in a case where the reduction rate of the output current is fast, the generation amount of $CO_2$ increases. For this reason, it is desirable to determine the reduction rate of the output current in comparison of and in consideration of the factors.

In the period during which the output current is reduced, in a case where the cathode stoichiometric ratio is maintained to be less than 1.0, the flow rate of the cathode gas is not limited to a given value. For example, the flow rate of the cathode gas may be gradually decreased according to the output current value being reduced.

In the current reduction processing of the second example, although an example where the output current is continuously reduced at a given rate, the disclosure is not limited thereto, the output current may be continuously reduced while changing the reduction rate of the output current.

In the second example, although the processing of Steps S1a and S4a1 is implemented by stopping and starting the air compressor 14, the disclosure is not limited thereto. For example, the opening degrees of the bypass valve 15 and the back pressure valve 17 are controlled in a state in which the drive of the air compressor 14 is continued, the cathode gas may bypass the FC 4 without being supplied to the FC 4. The state can be implemented in such a manner that the back pressure valve 17 fully closes the discharge pipe 12, and the bypass valve 15 communicates the supply pipe 11 upstream of the bypass valve 15 and the bypass pipe 13 while cutting off an upstream side and a downstream side of the bypass valve 15 of the supply pipe 11. Note that, in this case, since the power generation of the FC 4 is paused in Step S4, the drive of the air compressor 14 is based on the output of the BAT 8; however, from a viewpoint of suppressing consumption of charged power of the BAT 8, it is preferable to control the flow rate of the cathode gas to zero by stopping the air compressor 14.

In the second example, although the output current is reduced after restricting the flow rate of the cathode gas and then confirming an increase in cell voltage due to hydrogen pumping (Step S1a1), the disclosure is not limited thereto, and the reduction of the output current may be started without such confirmation.

THIRD EXAMPLE

Figure 8:
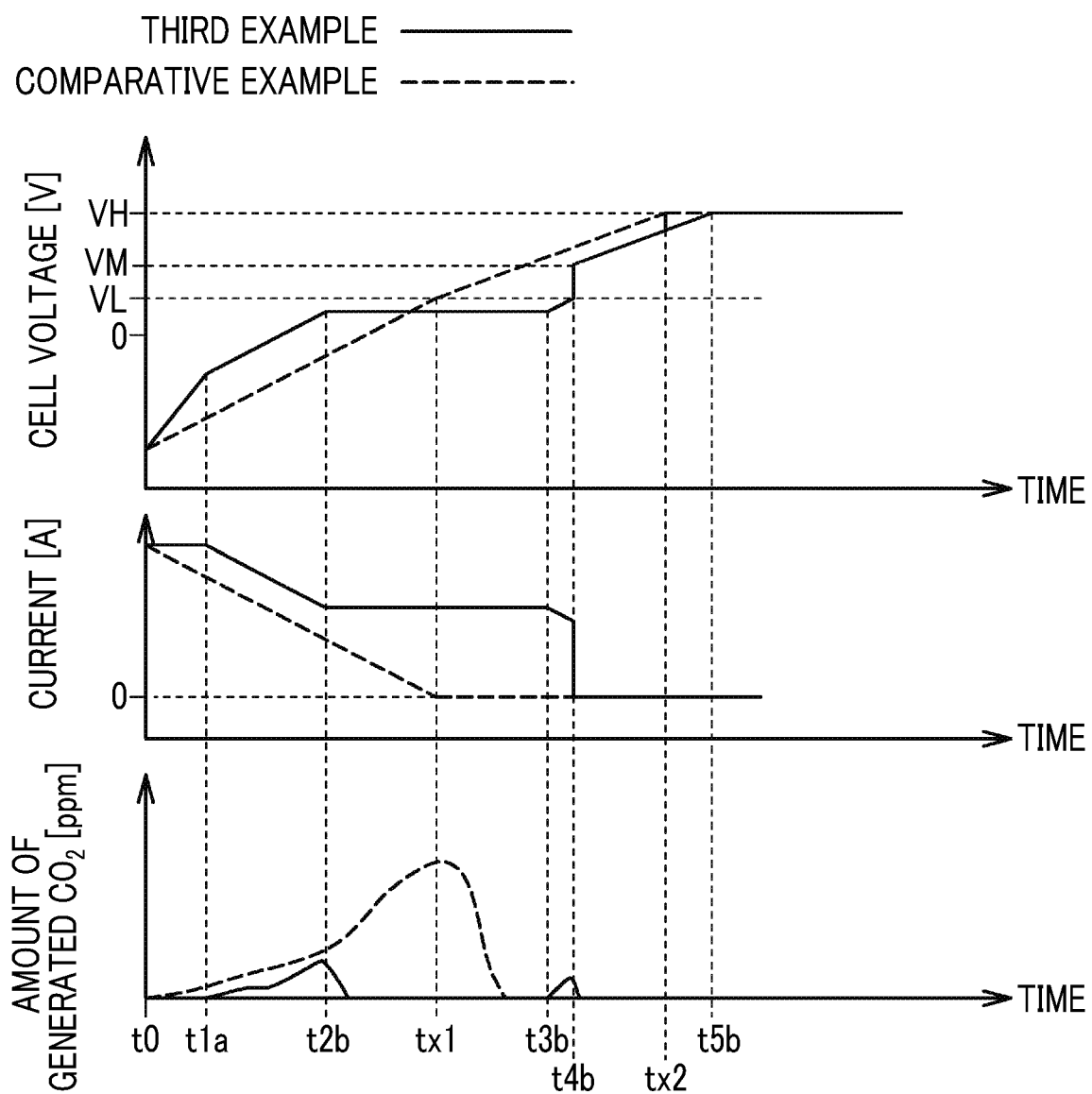
FIG. 8 is a timing chart showing an example of negative voltage elimination control of a third example.

In negative voltage elimination control of a third example, the cathode stoichiometric ratio is controlled to be less than 1.0, and the output current of the FC 4 is reduced in a stepwise manner. FIG. 8 is a timing chart showing an example of the negative voltage elimination control of the third example In FIG. 8, as in FIG. 3, values relating to a comparative example are indicated by dotted lines, and values relating to the third example are indicated by solid lines.

In the third example, the flow rate of the cathode gas supplied to the FC 4 is controlled to zero at time t0, that is, the cathode stoichiometric ratio is controlled to zero. The output current is reduced at time t1a, and the output current is maintained at a given value at time t2b. Reduction of the output current is started at time t3b, and in a case where the cell voltage of the negative voltage cell becomes equal to or greater than the threshold value VL at time t4b, the output current is controlled to zero. In a case where the output current is controlled to zero, the cell voltage of the negative voltage cell increases and becomes equal to or greater than the threshold value VM, and the supply of the cathode gas is restarted. With this, the cell voltage of the negative voltage cell starts to increase and becomes equal to or greater than the threshold value VH at time t5b, and the power generation restart standby processing is executed. In the third example, since the output current is reduced in a stepwise manner while using hydrogen pumping, it is possible to eliminate the negative voltage while suppressing the total generation amount of $CO_2$ compared to the comparative example or the first and second examples.

Figure 9:
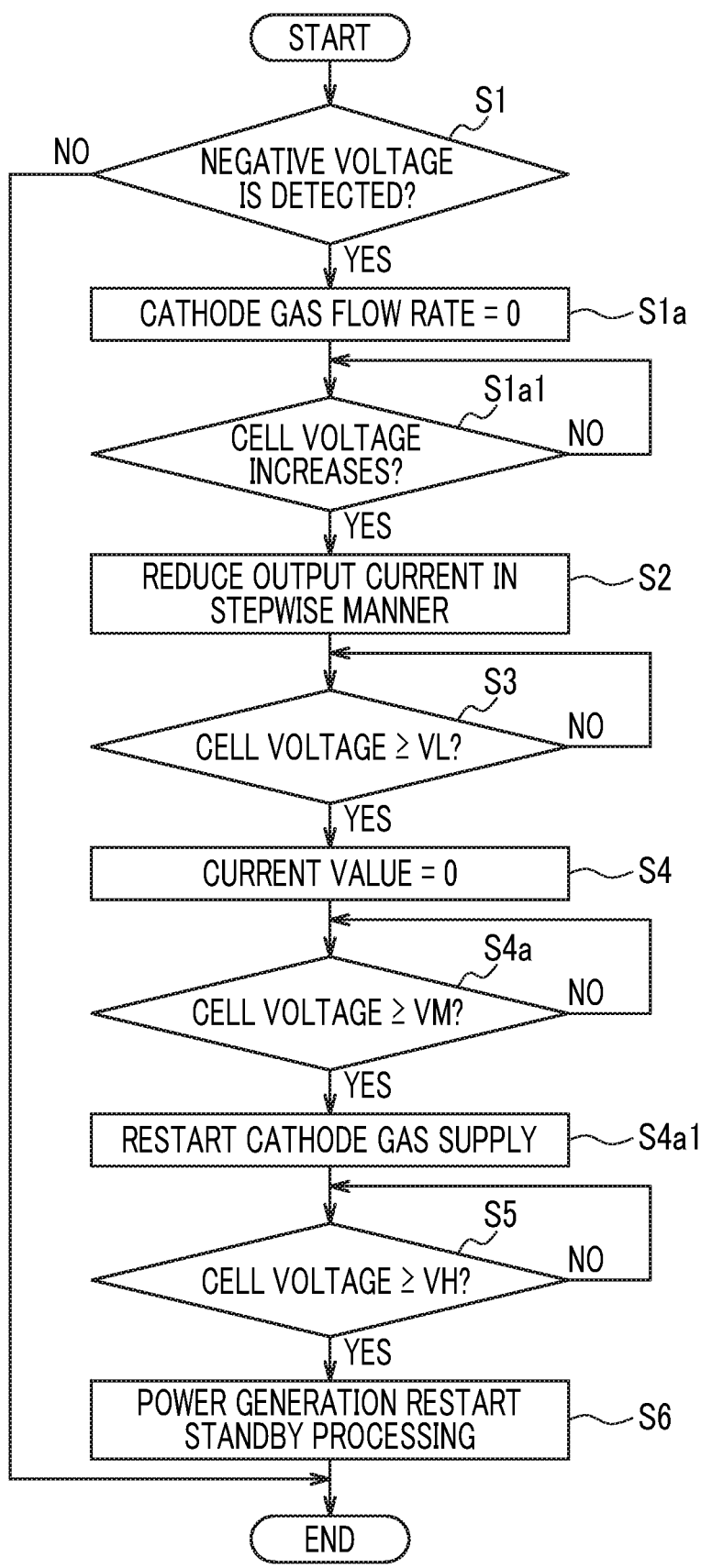
FIG. 9 is a flowchart showing an example of the negative voltage elimination control of the third example.

FIG. 9 is a flowchart showing an example of the negative voltage elimination control of the third example. In the negative voltage elimination control of the third example, description of the same processing as in the first and second examples will not be repeated. When the voltage of any unit cell is a negative voltage (in Step S1, Yes), the flow rate of the cathode gas is controlled to zero (Step S1a), and in a case where determination is made that the cell voltage of the negative voltage cell increases by the predetermined value or more (in Step S1a1, Yes), the ECU 3 reduces the output current in a stepwise manner (Step S2). Subsequent processing is the same as the processing after Step S3 in the second example.

In the current reduction processing of the third example, as in the second example, in a case where the cathode stoichiometric ratio is less than 1.0, the cathode gas may be continuously supplied to the FC 4. In the period during which the output current is reduced, the flow rate of the cathode gas is not limited to a given value. The reduction of the output current may be started without executing the processing of Step S1a1.

FOURTH EXAMPLE

In current reduction processing of a fourth example, the output current is reduced while being increased and decreased. For example, after the output current is reduced by a predetermined value ΔA, the output current is increased by a predetermined value ΔB smaller than the predetermined value ΔA, and thereafter, the output current is reduced again by the predetermined value ΔA.

Figure 10:
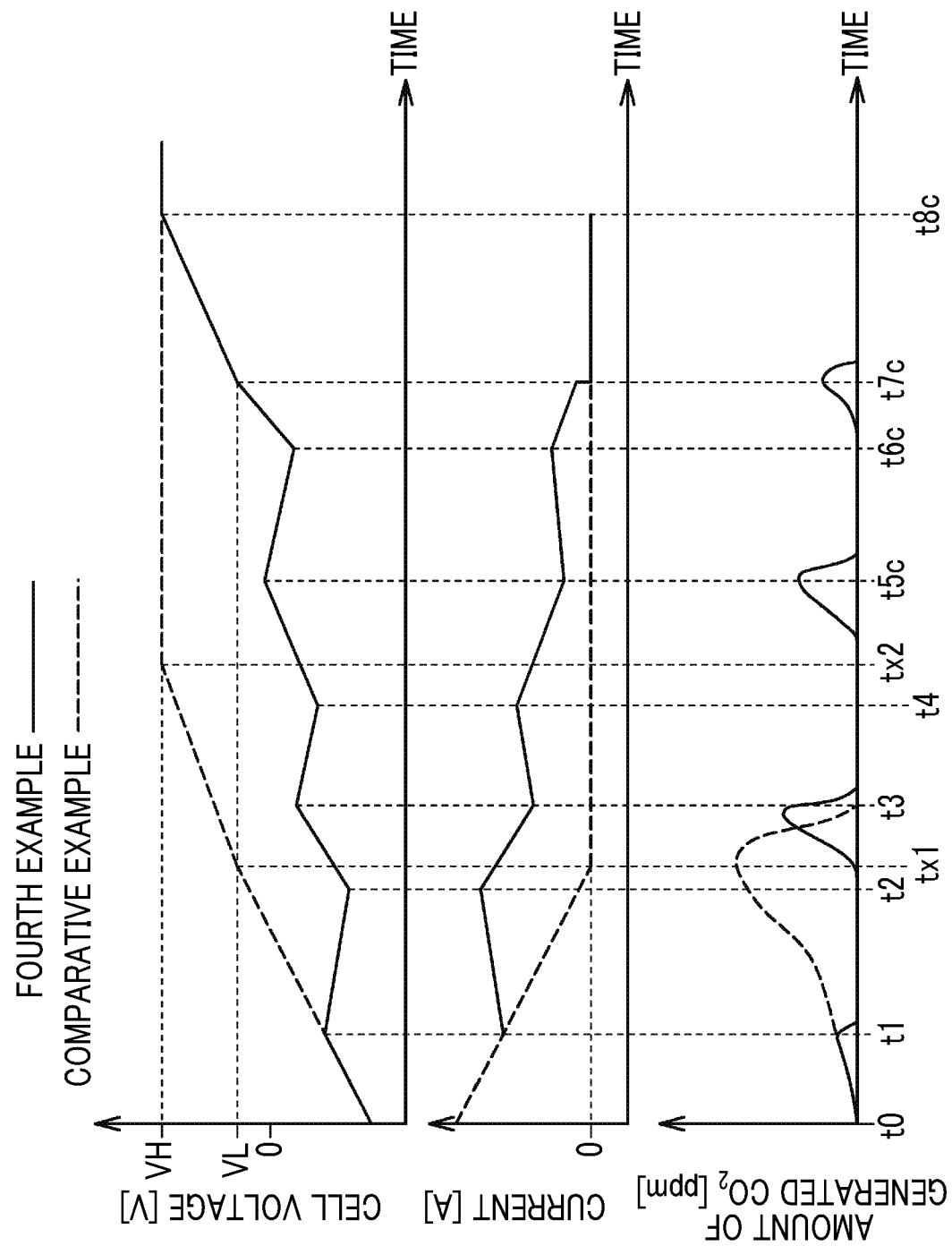
FIG. 10 is a timing chart showing an example of negative voltage elimination control of a fourth example.

FIG. 10 is a timing chart showing an example of negative voltage elimination control of the fourth example. In the fourth example, the output current is reduced by the predetermined value ΔA from time t0 to time t1, and the output current is increased by the predetermined value ΔB from time t1 to time t2. Similarly, the output current is reduced again by the predetermined value ΔA from time t2 to time t3, and the output current is increased by the predetermined value ΔB from time t3 to time t4. The output current is reduced by the predetermined value ΔA from time t4 to time t5c, and the output current is increased by the predetermined value ΔB from time t5c to time t6c. The output current is reduced from time t6c, and in a case where the cell voltage of the negative voltage cell becomes equal to or greater than the threshold value VL at time t7c, the output current is controlled to zero. In this way, even though the output current is reduced while being increased and decreased, it is possible to suppress the total generation amount of $CO_2$ compared to the comparative example. In a case where the cell voltage of the negative voltage cell becomes equal to or greater than the threshold value VH at time t8c, the power generation restart standby processing is executed.

The output current is reduced while being increased and decreased in this way, whereby it is possible to suppress reduction of the actual output of the FC 4 with the reduction of the output current of the FC 4. Accordingly, it is possible to suppress an increase of a shortage of the actual output of the FC 4 with respect to the requested output to the FC 4. With this, for example, even though a state of charge of the BAT 8 is comparatively small, it is possible to compensate for the shortage of the actual output with respect to the requested output to the FC 4 with the BAT 8. With this, it is possible to suppress reduction of the output of the FC4 to satisfy the requested output while performing the control for eliminating the negative voltage.

Figure 11:
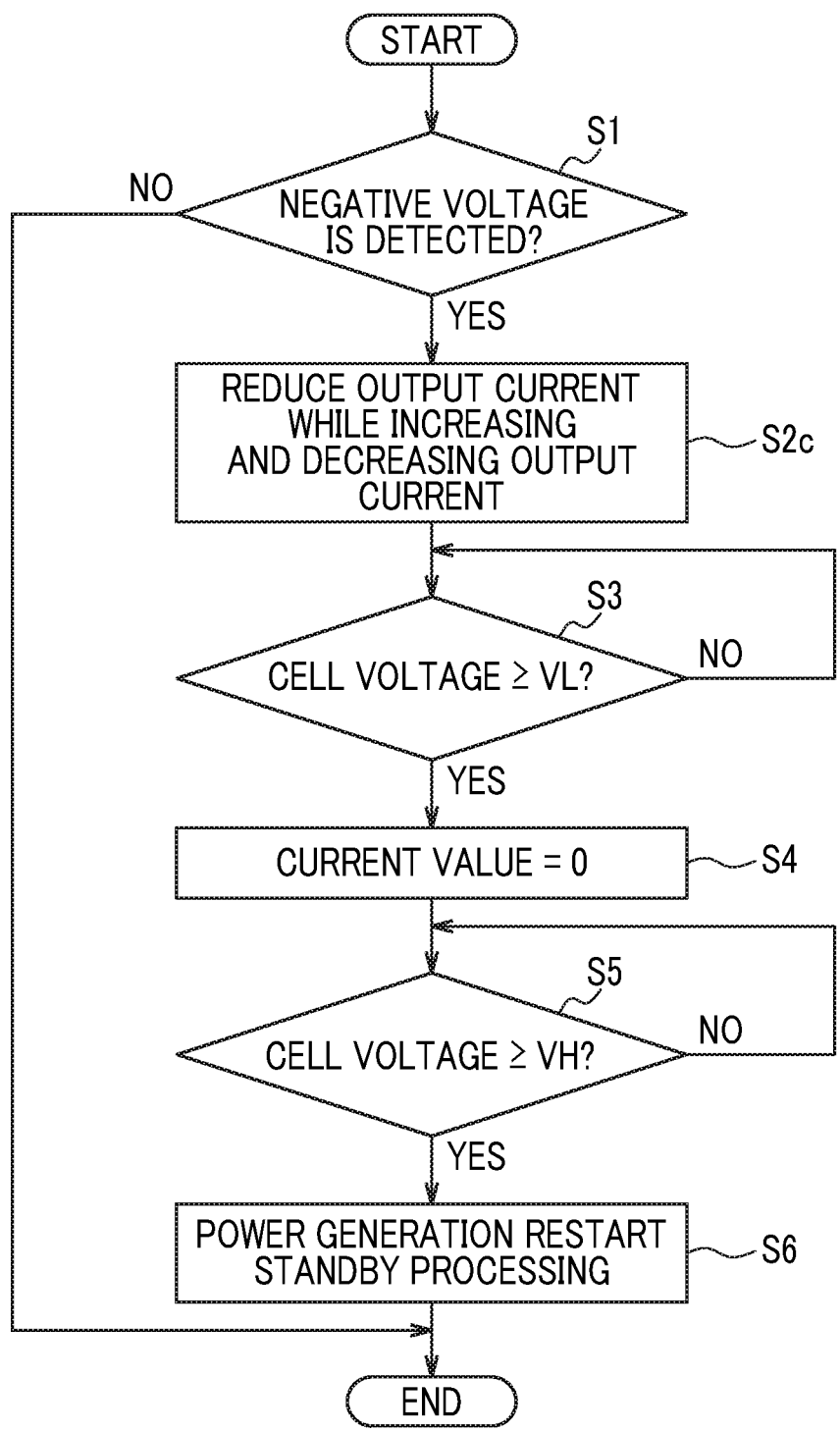
FIG. 11 is a flowchart showing an example of the negative voltage elimination control of the fourth example.

FIG. 11 is a flowchart showing an example of the negative voltage elimination control of the fourth example. In the negative voltage elimination control of the fourth example, description of the same processing as in the first example will not be repeated. When the voltage of any unit cell is a negative voltage (in Step S1, Yes), the ECU 3 reduces the output current of the FC 4 while increasing and decreasing the output current (Step S2c). Subsequent processing is the same as the processing after Step S3 in the first example, and thus, description will not be repeated.

It is preferable that the amount of increase of the output current is small. This is because, as the amount of increase of the output current is small, it is possible to reduce a time needed for increasing the cell voltage of the negative voltage cell to the threshold value VL, and to suppress the total generation amount of $CO_2$. For this reason, it is preferable that the predetermined value ΔB as the amount of increase of the output current is as small as possible with respect to the predetermined value ΔA as the amount of reduction of the output current. For example, it is preferable that the predetermined values ΔA and ΔB such that a relational expression (2×ΔB)<ΔA is established. The predetermined values ΔA and ΔB are determined more preferably such that a relational expression (3×ΔB)<ΔA is established, and still more preferably, such that a relational expression (4×ΔB)<ΔA is established.

In the fourth example, the cathode stoichiometric ratio is reduced to be less than 1.0, and the output current may be reduced while being increased and decreased. In the current reduction processing of the fourth example, the output current may be increased after being maintained at a given value for a predetermined period. In the current reduction processing of the fourth example, the output current may be increased after reducing the output current, and thereafter, the output current may be maintained at a given value after reducing the output current or the output current may be maintained at a given value after reducing the output current, and thereafter, the output current may be increased after reducing the output current.

Although the preferred embodiment of the disclosure has been described above in detail, the disclosure is not limited to such a specific embodiment, and various modifications and alterations may be made within the scope and spirit of the disclosure described in the appended claims.

What is claimed is:

1. A fuel cell system comprising:
a fuel cell stack in which a plurality of unit cells is stacked;
a detection unit configured to detect a cell voltage of at least one of the unit cells;
a converter configured to regulate an output current of the fuel cell stack; and
a control device configured to control the converter,
wherein the control device executes current reduction processing for reducing the output current in a stepwise manner when the cell voltage detected by the detection unit is a negative voltage, and
wherein, in the current reduction processing, the control device sets a period during which the output current is maintained at a given value to be longer than a period during which the output current is reduced.

2. The fuel cell system according to claim 1, further comprising a regulation device configured to be controlled by the control device and regulate a flow rate of cathode gas to be supplied to the fuel cell stack,
wherein the control device restricts the flow rate of the cathode gas such that a cathode stoichiometric ratio becomes less than 1.0 and executes the current reduction processing when the cell voltage detected by the detection unit is a negative voltage.

3. The fuel cell system according to claim 1, wherein the control device reduces the output current to zero in the current reduction processing.

4. The fuel cell system according to claim 1, A fuel cell system comprising:
a fuel cell stack in which a plurality of unit cells is stacked;
a detection unit configured to detect a cell voltage of at least one of the unit cells;
a converter configured to regulate an output current of the fuel cell stack;
a control device configured to control the converter; and
a regulation device configured to be controlled by the control device and regulate a flow rate of cathode gas to be supplied to the fuel cell stack,
wherein the control device executes current reduction processing for reducing the output current in a stepwise manner when the cell voltage detected by the detection unit is a negative voltage, and
wherein the control device reduces the output current to zero in the current reduction processing, and after the current reduction processing is completed, controls the flow rate of the cathode gas to control an open-circuit voltage of the fuel cell stack within a target range while maintaining the output current at zero.

* * * * *